May 13, 1958  H. F. JAMROGOWICZ  2,834,807
MANUFACTURE OF CARPETS

Original Filed May 4, 1953

INVENTOR
HARRY F. JAMROGOWICZ,
BY ATTY.

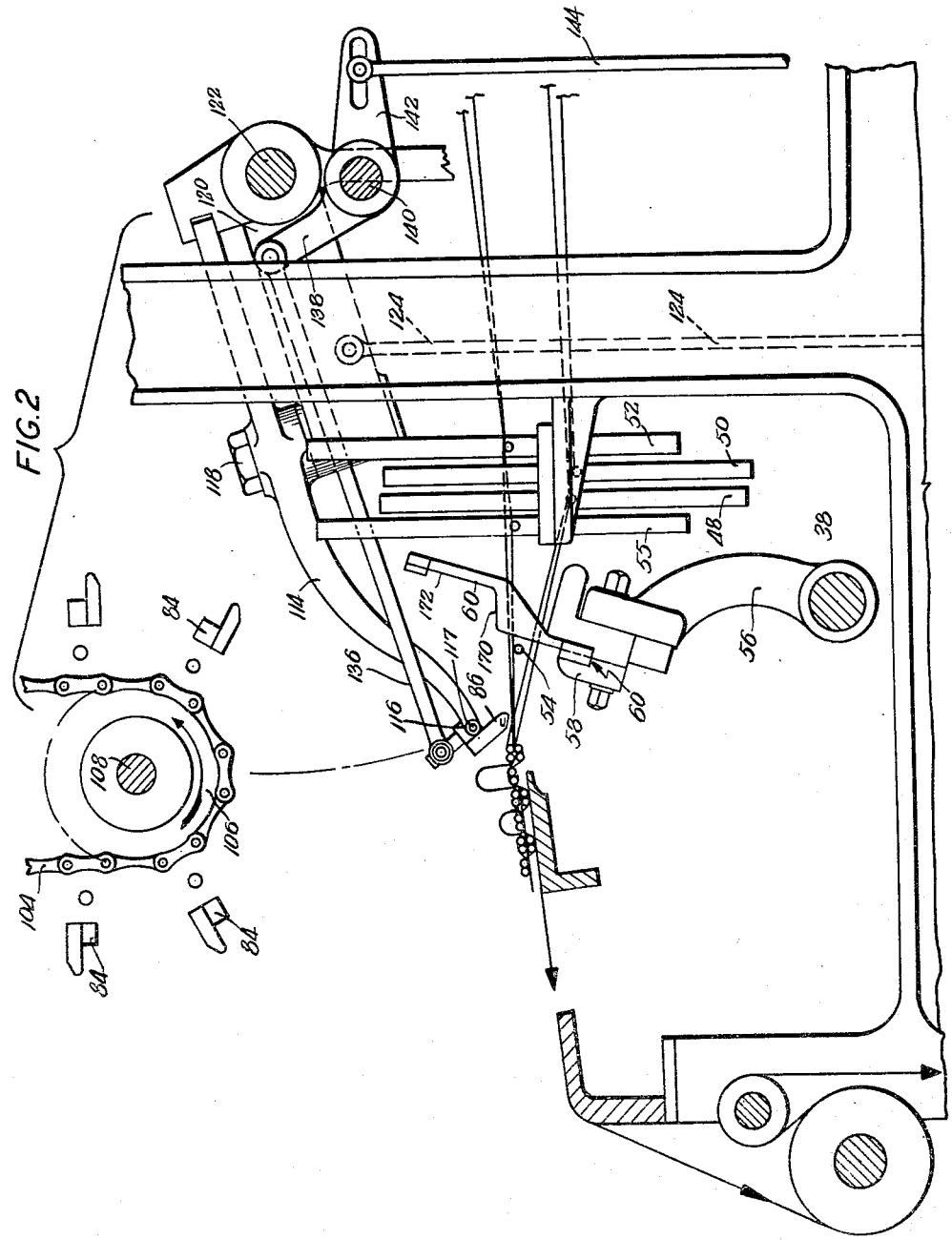

May 13, 1958 H. F. JAMROGOWICZ 2,834,807
MANUFACTURE OF CARPETS
Original Filed May 4, 1953
9 Sheets-Sheet 3
FIG.3
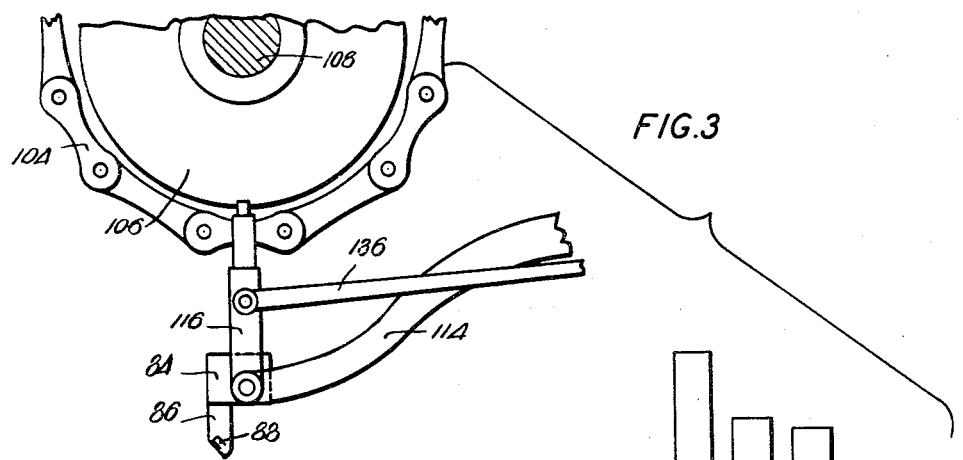
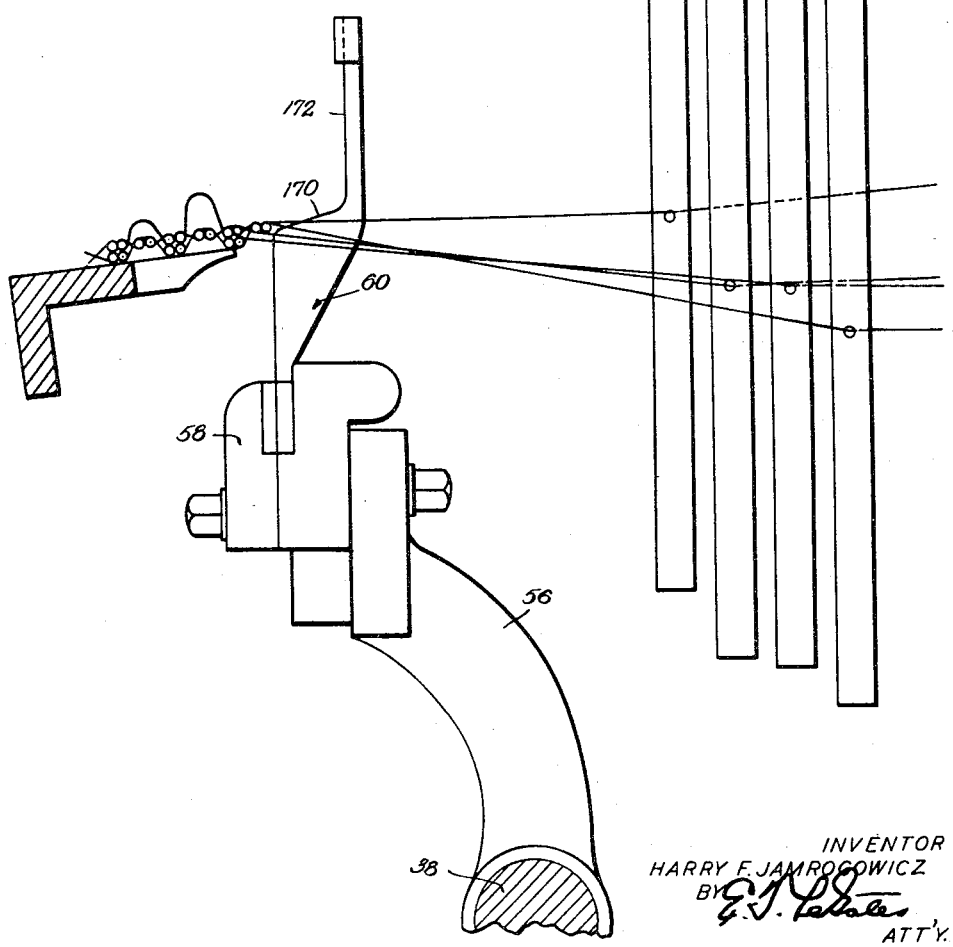
INVENTOR
HARRY F. JAMROGOWICZ
ATT'Y.

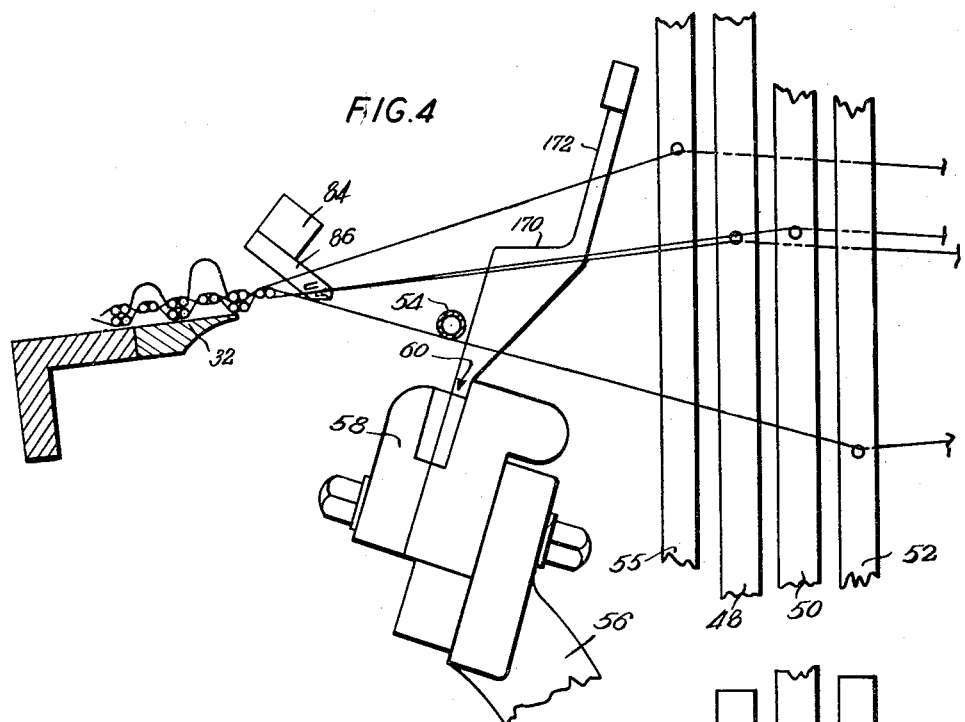
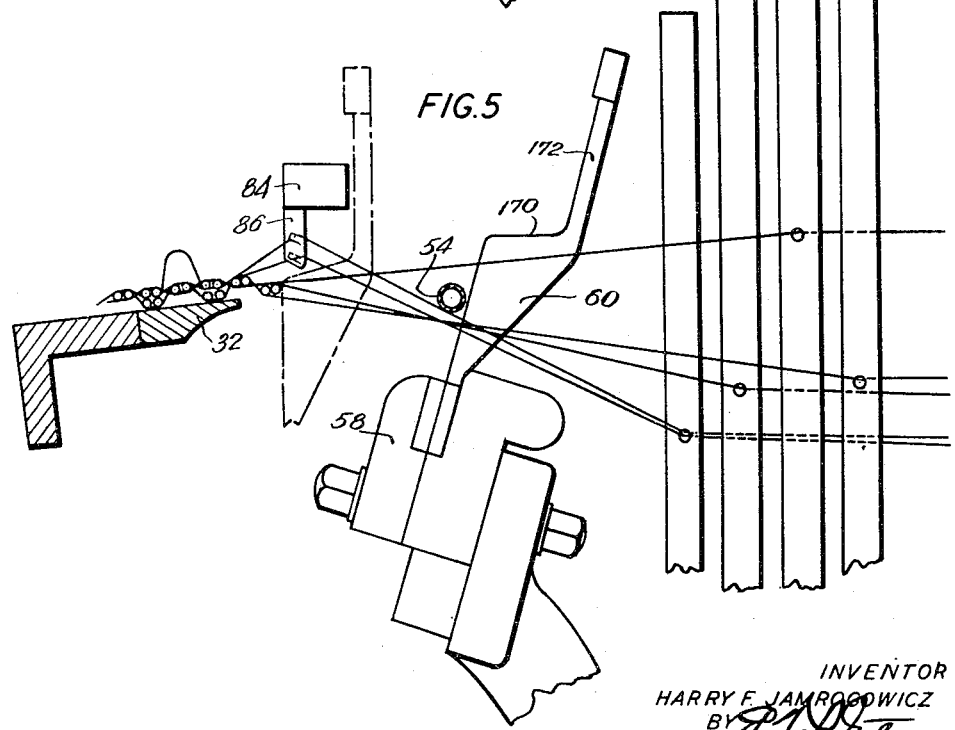

May 13, 1958 H. F. JAMROGOWICZ 2,834,807
MANUFACTURE OF CARPETS
Original Filed May 4, 1953 9 Sheets-Sheet 5
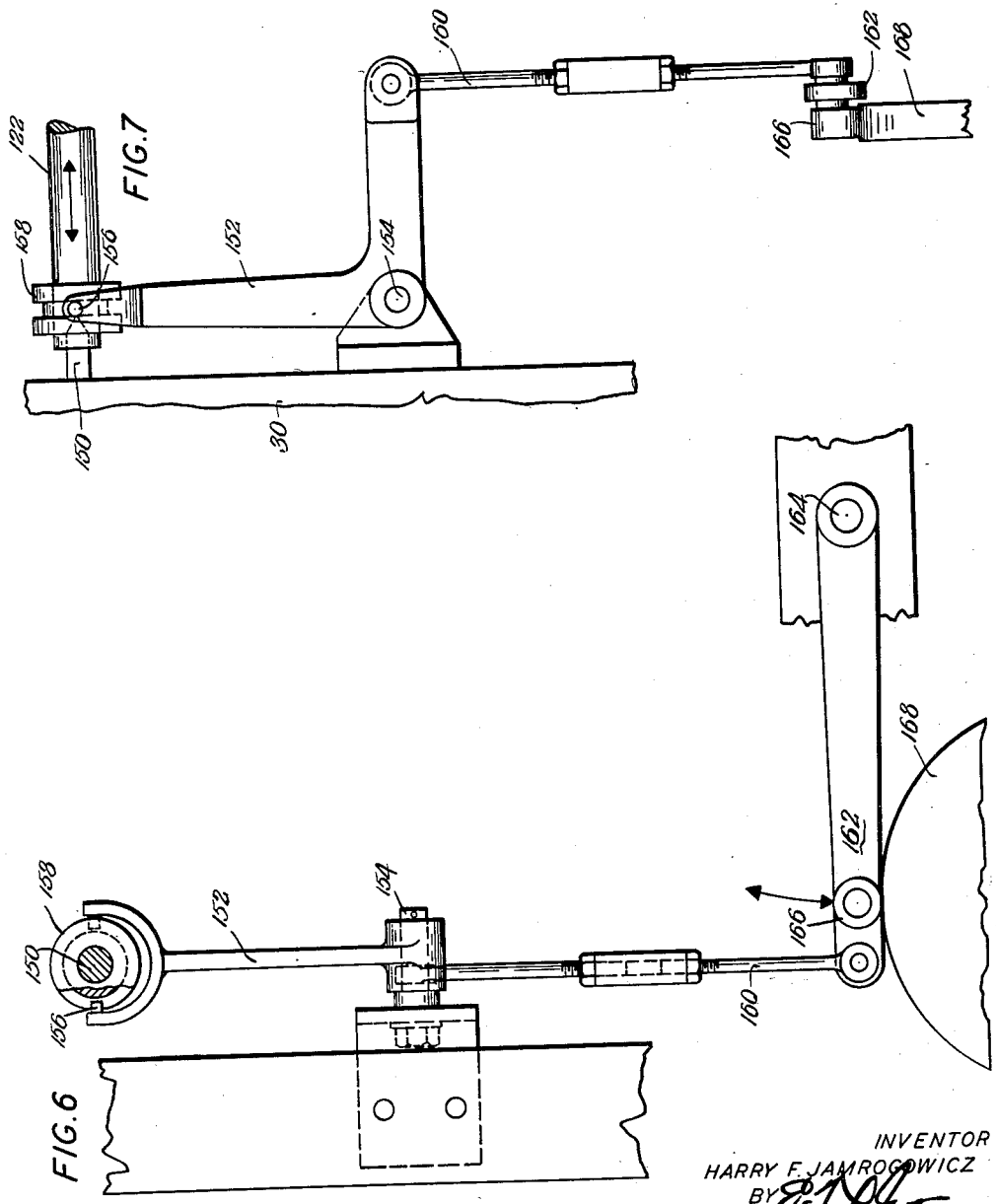

May 13, 1958  H. F. JAMROGOWICZ  2,834,807
MANUFACTURE OF CARPETS
Original Filed May 4, 1953  9 Sheets-Sheet 6
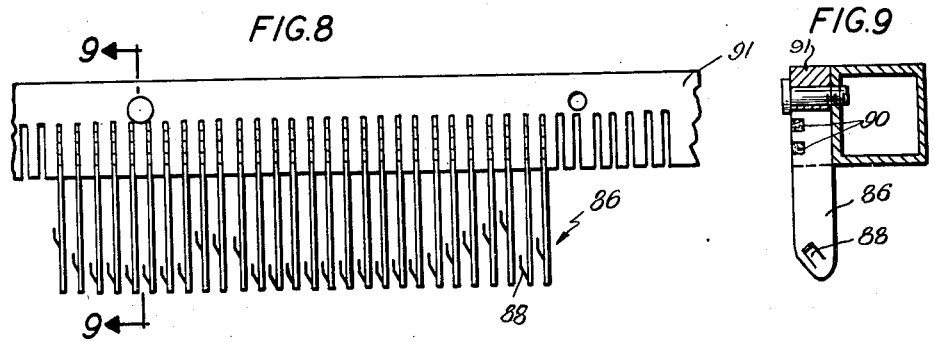
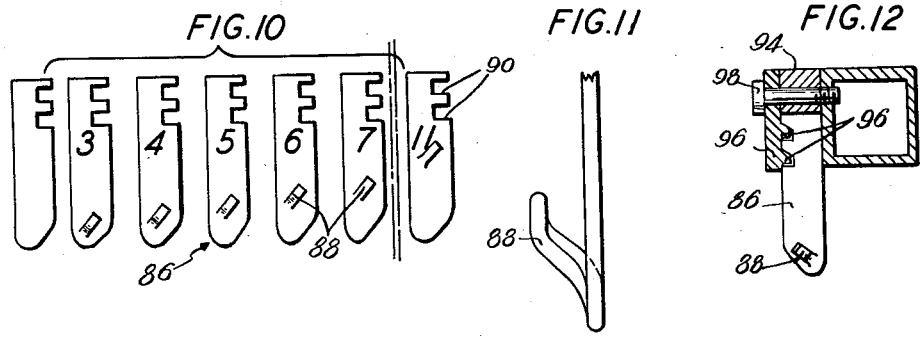
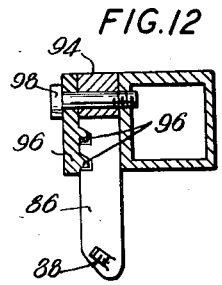
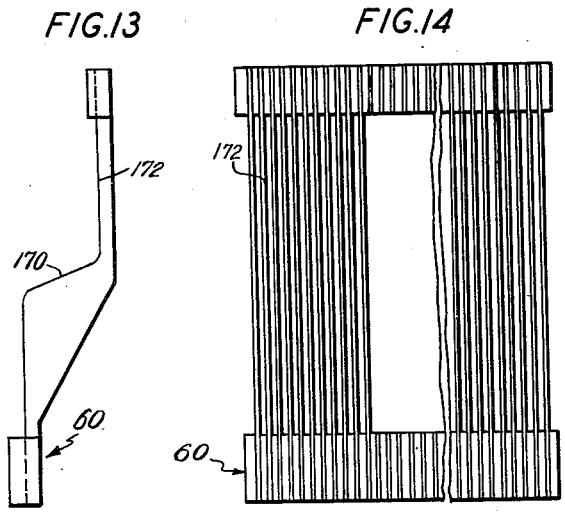
INVENTOR
HARRY F. JAMROGOWICZ
BY
ATT'Y.

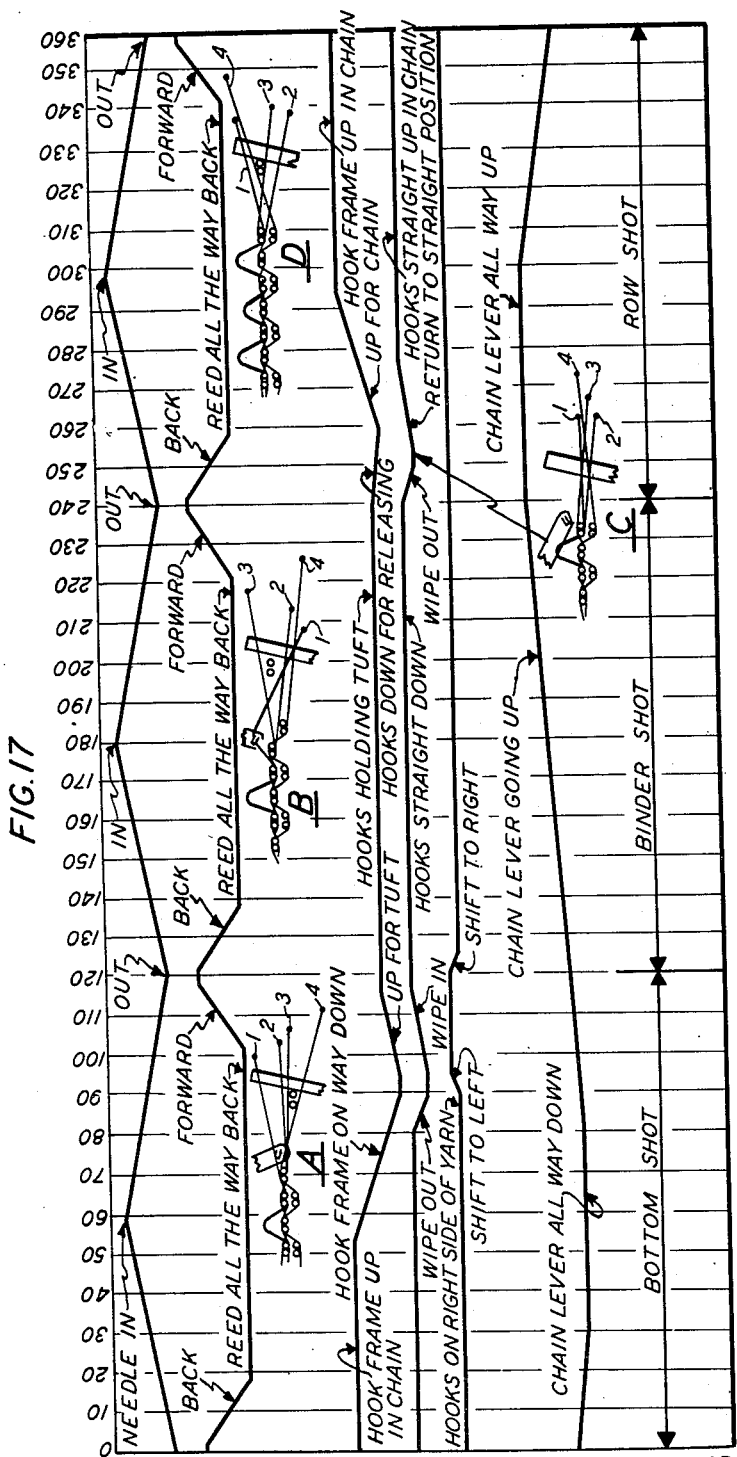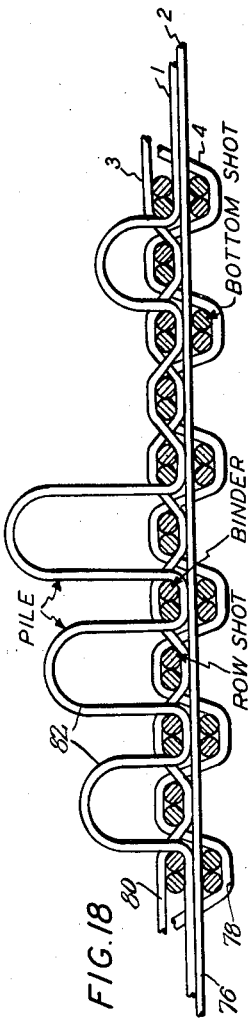

May 13, 1958  H. F. JAMROGOWICZ  2,834,807
MANUFACTURE OF CARPETS

Original Filed May 4, 1953  9 Sheets-Sheet 8

INVENTOR.
HARRY F. JAMROGOWICZ
BY
ATTY.

May 13, 1958     H. F. JAMROGOWICZ     2,834,807
MANUFACTURE OF CARPETS

Original Filed May 4, 1953     9 Sheets-Sheet 9

INVENTOR.
HARRY F. JAMROGOWICZ,
BY
ATT'Y.

2,834,807

MANUFACTURE OF CARPETS

Harry F. Jamrogowicz, Hazardville, Conn.

Original application May 4, 1953, Serial No. 352,874. Divided and this application June 3, 1954, Serial No. 434,209

5 Claims. (Cl. 139—406)

The present invention relates to improvements in the manufacture of carpets, and more particularly to an improved drawn loop pile fabric.

It has been, for many years, a primary concern of the carpet manufacturers to produce on carpet looms looped pile surface fabrics in which pile loop height may be automatically controlled as a useful element of carpet construction and design. Heretofore, limited success only has attended these efforts. Apparatus and methods now in use have limited capacity for selection and control of loop height either weftwise or warpwise of the fabric.

It is a principal object of the invention to produce an improved pile carpet adapted to be woven on a power driven carpet loom, in which the height of each pile loop is individually and accurately controllable under a substantial range, whereby, a greatly increased number and variety of carpet pile patterns with novel arrangements of high, low and intermediate height loops are made possible.

It is a further object of the invention to produce an improved carpet of the type having an Axminster backing and pile loops of different adjusted lengths varying from short to long, and such pile loops are formed from pile warps which are drawn into loops in successive rows of weaving.

In a co-pending application for Letters Patent in the United States Patent Office, Serial No. 352,874, filed May 4, 1953, of which the present application is a division, I have described and illustrated a novel apparatus and method well adapted to produce the drawn loop pile fabric which forms the subject matter of the present invention.

The apparatus, referred to, for producing the improved pile loop surface carpet of the invention, comprises a hook bar together with supporting and actuating parts which operate the bar and hooks mounted thereon to engage and to draw upwardly loops of shedded pile warps, while the lay is operated first to beat up the previously inserted weft shot and again to beat up the next succeeding tying-in weft shot inserted after the harnesses carrying the pile warps have been moved downwardly to the tying-in position. Following this second beating up operation, the hook bar is further manipulated to disengage the hooks from the formed loops. As more fully set forth in the co-pending application, referred to, the invention is well adapted to be carried out on an Axminster loom or alternatively on a cam loom of ordinary description.

A hook bar having a novel construction and arrangement of the hook elements is provided, which operates the hook elements in a novel manner and with a high degree of accuracy and precision to form loops of the desired height. The hook elements referred to comprise a series of flat elements, each having a hook projecting from one face thereof. The hooks are particularly shaped so that a downward thrusting movement combined with a slight counter-clockwise rocking movement, as shown in Fig. 17 at A, and a return upward movement combined with a slight clockwise rocking movement of the hook bar and elements mounted thereon, as shown in Fig. 17 at B, in combination with a slight lateral movement of the hook bar causes the hooks to engage and to form loops from the pile warps. Each hook is shaped so that for a vertical position of the hook shank the hook opening is canted toward the left, as shown in Figs. 8 and 11, away from the lay. The arrangement is such that a subsequent substantial counter-clockwise rocking movement of the hook bar and hooks about the bar axis, as shown in Fig. 17 at C, causes the hooks to be rocked counter-clockwise out of engagement with the newly formed pile loops.

With the above noted and other objects in view as may hereinafter appear, the several features of the invention together with the advantages to be obtained thereby will be readily understood by one skilled in the art from the following description taken in connection with the accompanying drawings, in which Fig. 1 is a somewhat diagrammatic side view of a loom constructed and arranged to illustrate in a preferred form certain features of the invention;

Fig. 2 is a view on an enlarged scale of a portion of the machine shown in Fig. 1 to illustrate elements of the weaving mechanism which are shown in the positions taken as the pile loop forming hooks are wiping out;

Fig. 3 is a view on a still larger scale of parts of the weaving mechanism shown in the previous views, the hook bar arms being shown in the position of clutching a hook bar from the endless chain carrier;

Fig. 4 is a view of parts of the weaving mechanism shown in previous views, the parts being shown in the positions taken when the number 2, or bottom shot, is inserted into the shed, and the hook bar is thrust downwardly through the shedded pile warps;

Fig. 5 is a view of parts of the weaving mechanism shown in previous views, the parts being shown in the positions taken when the number 3, or binder shot, is inserted into the shed, and the hook bar has been withdrawn to form pile loops of selected heights;

Fig. 6 is a detail side view of the cam and follower connections for effecting an axial shift on the hook bar and its supporting arms, adapted for moving the projected hooks laterally into engagement with the shedded pile warps;

Fig. 7 is a rear view of substantially the parts shown in Fig. 6;

Fig. 8 is a fragmentary front view of a portion of a hook bar and elements supported therein having hooks at different selected heights;

Fig. 9 is a sectional view taken on the line 9—9 of Fig. 8, illustrating particularly the manner in which the hooks are soldered in place in the hook bar;

Fig. 10 is a detail view showing a series of pile loop-forming hooks of different vertical positions adapted for forming warp pile loops ranging from substantially $3/16''$ to $12/16''$ in height;

Fig. 11 is a fragmentary view on an enlarged scale of the hook designated by the number 3 in Fig. 10 looking from the right;

Fig. 12 is a view similar to Fig. 9 but showing an alternate method of securing the hook elements in position in the bar;

Fig. 13 is a view in side elevation of the reed forming part of the reciprocating lay;

Fig. 14 is a fragmentary view in front elevation of the reed shown in Fig. 13;

Fig. 17 is a timing chart showing the relative timing of the several operating mechanisms of the loom;

Fig. 18 is an enlarged sectional view of a carpet woven in accordance with the invention;

Figure 1:
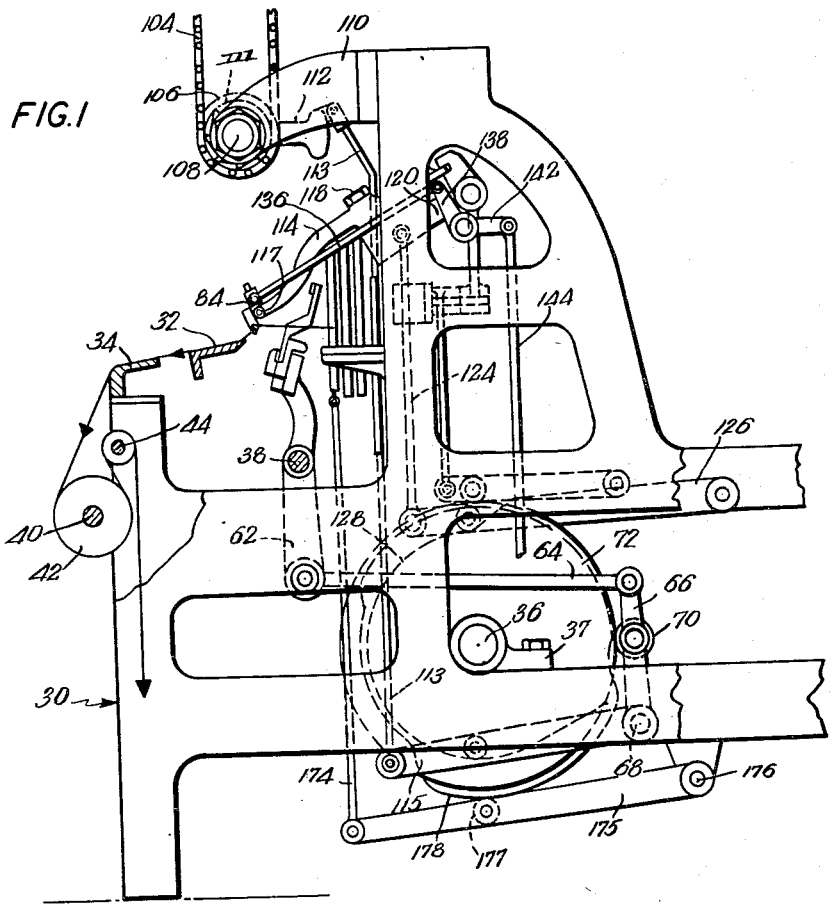

Referring specifically to the drawings, Figs. 1 and 2 illustrate basically portions of a carpet loom embodying features of the invention including a machine frame having side frames 30, a guide plate 32 for supporting the newly formed fabric as it is beaten up by the lay, and a breast plate 34 over which the fabric is drawn from the machine extending between the frames. The side frames 30 provide support for various operating shafts including a main cam shaft 36 carried in bearings 37 on the frames 30, a lay pivot shaft 38, a fabric take-up shaft 40 which carries a fabric take-up roller 42, and a small idler roller supporting shaft 44. The loom is provided with suitable harness frames including a stuffer warp harness frame 48, a semi-stuffer warp harness frame 50, and a chain warp harness frame 52. The loom is further provided with a weft inserting needle generally indicated at 54 in Fig. 2, which operates to insert doubled or looped weft thread into the shed. Successively inserted loops of the weft are enchained with one another to form a selvage by means of a reciprocating looper device, not shown. There is also provided a pile warp harness frame 55 which cooperates with the pile loop forming mechanism provided in accordance with the invention as hereinafter more fully set forth.

The lay comprises a pair of upwardly extending arms 56 pivoted on rocker shaft 38, and provided at their upper ends with holders 58 in which is mounted a reed 60. Forward and backward movements are imparted to the lay 56 by means of a downwardly extending arm 62 secured to rocker shaft 38 and connected by means of a link 64 with the upper end of a cam lever 66 which is pivotally connected at its lower end 68 to a portion of the machine frame. A cam follower 70 supported on the cam lever is adapted for engagement with a lay operating cam.

The several harness frames are arranged to be moved up and down to form successive warp sheds by ordinary jacquard and cam mechanisms well known in the art.

Inasmuch as the elements of the loom above referred to are well known in the art, as shown for example in U. S. Letters Patent No. 1,904,939, dated April 18, 1933; U. S. Patent No. 233,290, dated October 12, 1880; and in U. S. Patent No. 1,475,261, dated November 27, 1923, a more detailed illustration or description of these parts is deemed unnecessary and will be omitted.

The loom thus generally described is adapted to produce an Axminster type fabric ground. As best shown in Figs. 17 and 18, the loom is set up to produce a so-called conventional three-shot weave in which three successive weft shots, each comprising a pair of wefts, are inserted into successively formed sheds for the production of each successive row of weaving. The three shots, as entitled in Figs. 17 and 18, comprise a bottom shot, a binder shot and a row shot which are inserted through successively formed sheds in that order. The various weft shots are located in their respective high and low positions at opposite sides of stuffer warps 76, being held in position by chain warps 78 and semi-stuffer warps 80. The pile warps are shown at 82.

The mechanism provided in accordance with the invention, for producing on a carpet loom loop pile fabric having pile loops varying in height both warpwise and weftwise, comprises a hook bar 84 which, as best shown in Figs. 8, 9 and 12, has mounted thereon a series of replaceable hook elements 86, each having formed in one face thereof a hook 88 which is located on the element 86 to form a loop of selected height. The hook bar is supported, as hereinafter set forth, to be moved or projected downwardly so that the hook elements are moved between shedded pile warps (see insert A in Fig. 17), are then moved slightly laterally and are withdrawn to engage upon and draw loops of said pile warps upwardly on the hooks (see insert B, Fig. 17). Finally, the hook bar is rocked in a counter-clockwise direction (see insert C in Fig. 17) to free the drawn and tied-in loops from the hooks. The hook elements 86 are particularly constructed and arranged to be moved in the manner described. As shown in Figs. 8 and 9, each hook member comprises a flat metal element formed at its upper end with a pair of notches 90 and fitted and soldered into a slotted holder plate 91. An alternate construction shown in Fig. 12 includes a cover plate 94 having a pair of locking ribs 96 engaging in the notches and secured by screws 98 to the hook bar 84. The hook 88 formed on the face of each hook element 86 has its opening facing upwardly and to the left of the vertical as shown, for example, in Figs. 9 and 12, so that a rocking movement of the bar 84, counter-clockwise, will be effective to cast off or free the drawn and tied-in loops from the hooks.

It will be noted that the hooks, as shown in Fig. 10, are spaced upwardly by different amounts on the hook elements 86 so that they will be caused to form loops of different heights from the engaged pile warps, a hook disposed toward the lower end of the hook element being adapted to form the lowest loops, and the hook disposed at the highest point on the hook element acting to form the highest loops.

It will be noted that each of the hook elements at its lower or hook end is cut away along one edge to provide a maximum of clearance between the hook bar and the surface of the woven fabric, particularly during the counter-clockwise rocking movement of the hook bar 84, to disengage the drawn and tied-in loops from the hooks 88.

The hook elements 86, identical except for the location of their hooks 88, are freely interchangeable so that an accurate control of the height of each individual loop along the length of the hook bar is attained by the selection and placing the hook elements having correspondingly formed hooks in the bar.

In the form of the apparatus particularly illustrated it is contemplated that a separate hook bar, having a desired selection of high, low and intermediate hooks, will be provided for the formation of the pile loops with each successive row of weaving required for the construction of a desired carpet pile surface pattern.

For storing and for moving the hook bars successively to an operating position, and for moving the hook bars into and out of operating position, use has been made of an endless chain carrier mechanism, clutching devices and clutch arms which may be similar to those provided, for example, with the Axminster looms described in the above noted patents. Inasmuch as the clutches and the devices for detachably securing the hook bar to the endless chain carrier are fully shown in one or more of the patents referred to, these parts will be described only so far as necessary to indicate the connection of the present invention therewith.

The endless chain carrier provided in accordance with the invention comprises a pair of endless chains 104 passing around sprockets 106 on a carrier drive shaft 108 located substantially above the weaving point on a pair of forwardly extending brackets 110 formed integrally with the upper portion of the side frames 30. The endless chain carrier 104 may be of any desired length, being suitably supported along its length above the machine. The endless chain carrier 104 provides support for a group of hook bars such as that indicated in Figs. 3, 4, 5 and 8 which are mounted at intervals on carrier links of the chains.

The endless chain carrier is adapted to have imparted thereto stepped feeding movements timed with relation to the rotation of the main cam shaft. The actuating mechanism may, for example, be a pawl and ratchet stepped feed device including a ratchet 111 on shaft 108, a pawl lever 112, link 113 and cam actuated lever 115 (see Fig. 1) which is operated by means of a cam on the main cam shaft and acts to impart a stepped rotational movement to the carrier drive shaft 108. Since a feed device of this description is well known for use on Axminster looms for the moving of tuft spool frames successively into position and since such a device is fully illustrated in the patent to Dunn 1,475,261, above referred to, further description of this mechanism is believed unnecessary.

The hook bars 84 are brought successively to an operative position above the weaving point where each hook bar, in turn, is detached from the chain and moved downwardly into active operation by means of a hook bar actuating mechanism which includes a pair of hook bar actuating arms 114 and associated clutches 116 which are pivotally supported at 117 on the arms 114.

Figure 16:
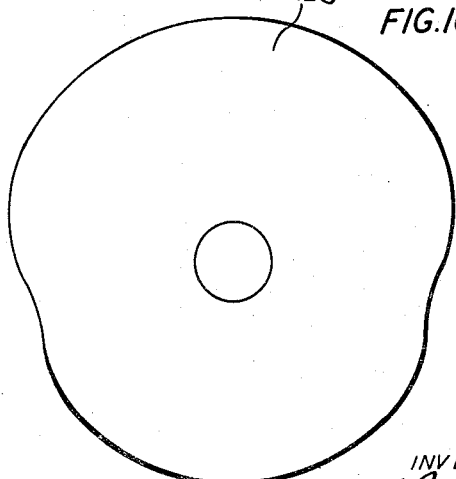
Fig. 16 is a detailed view of the hook arm cam.

The mechanism for holding the hook bars in the chains and for releasing the hook bars from the chains is of a type normally employed for the holding and releasing of the tube frames of an Axminster loom as shown, for example, in the patent to Barrett No. 1,904,939. Further description of this mechanism is believed unnecessary and is therefore omitted herein. The clutches 116 are operable to detach and to reengage the hook bars with the carrier chains as best shown in Figs. 2 and 3. Each arm 114 is pivoted at 118 to a member 120 to swing in a substantially horizontal plane, the member 120 being, in turn, supported on a horizontally disposed shaft 122 to swing in a substantially vertical plane. The shaft 122 is rocked to move the hook bar actuating assembly between raised and lowered positions by a mechanism which may be of ordinary description comprising a vertically disposed link 124 connected at its upper end to one of the members 120 and connected at its lower end to a cam lever 126 having a follower roller for engagement with a cam 128 on the main cam shaft 36 (see also Fig. 16). To move the clutches 116 toward and away from the ends of the hook bars for the purpose of disengaging a hook bar from the chains, and thereafter of releasing to the chains a hook bar which has been returned, the arms 114 are moved toward and away from each other by means of connections not here specifically illustrated since these parts are conventional and operate in a manner well known in the art. This mechanism may comprise two links connecting the rear ends of arms 114 with opposite ends of a vertically disposed pivoted arm which is rocked by a suitable cam and follower connection with cam shaft 36 swinging the arms 114 toward and away from one another.

In accordance with the present invention the arms 114 are caused to rock up and down while at the same time the clutches 116 and hook bar 84 mounted thereon are turned slightly on their pivots 117 to engage with and form pile loops of the desired height from the raised pile warps. A lateral movement is imparted to the hook bar and hooks while projected through the pile warp shed so that each hook member is shifted transversely to engage each pile warp with certainty in the associated hook. The mechanism for rocking the clutches 116 and hook bar 84 about the pivotal connections at 117 comprises a pair of links 136, each connected between a clutch 116 and an upwardly extending arm 138 secured to a rocker shaft 140. A second arm 142 secured to the rocker shaft is connected by a link 144 with a cam follower lever controlled by a cam, not specifically shown, on the main cam shaft 36.

The entire assembly comprising the actuating arms 114, the supporting members 120 and pivot shaft 122 to which they are secured is shifted as a single unit through the small distance required to effect a lateral shifting movement of the hooks. To this end the rocker shaft 122 is bored axially at each end and mounted to turn on two bearing pins 150 carried on the frame 30 (see Figs. 6 and 7), and is further arranged for a limited axial movement with relation thereto. Axial movement is imparted to the shaft 122 and to the hook actuating assembly carried thereby by means of connections which include a bell crank 152 pivoted at 154 on the frame 30, one arm of the bell crank being provided with a bifurcated yoke and trunnions 156 which engage with a groove formed in a collar 158 secured to the shaft. The other arm of the bell crank is connected by an adjustable link 160 with a cam lever 162 which is supported to turn on a pivot 164 on the frame and is provided with a follower roller 166 which rides on a cam 168 on the cam shaft 36.

As shown in Figs. 3, 4 and 5, and more particularly in Figs. 13 and 14, the reed 60 has a novel shape which causes the reed to cooperate effectively with the hook bar for the forming of pile loops of different predetermined heights. Below and up to the beating up level the reed is constructed and shaped in the normal manner to engage and to beat up the successively inserted weft shots into the fell. Above the level of the fell the dents of the reed are cut back sharply at 170, and thereafter in accordance with the invention are extended upwardly at 172 to accommodate a pile warp shed which is located substantially above the normally employed Axminster ground fabric shed to provide adequate clearance for the insertion of the pile loop forming hooks.

The arrangement shown is novel and has substantial advantages over shed forming and beating up operations of the prior art. With the construction illustrated, the hook bar is mounted substantially over the beating up point and is well adapted to cooperate in a most efficient manner with the reed and the shedding devices to engage with and to form a row of pile loops. The operating relationship of the reed and the hook bar has been found to be most effective in the drawing of loops of the shedded pile warps to a height which corresponds exactly with the vertical position of the cooperating hooks, and which causes the loops as they are beaten into the fell to stand upright in the fabric.

Figure 15:
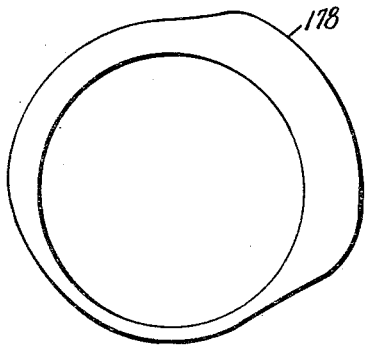
Fig. 15 is a detailed view of the yarn heddle cam.

The mechanism for controlling the positions of the stuffer warp harness frame 48, the semi-stuffer warp harness frame 50, and the chain warp harness frame 52, corresponds with such mechanism normally provided for shedding an Axminster loom, is well known in the art, and is therefore not here specifically shown or described. The mechanism for controlling the position of the pile warp harness frame 55 provided herewith, and as specifically shown in Fig. 1, comprises a link 174 connected between the lower edge of the harness frame 55 and a horizontally disposed cam lever 175 supported to turn on a pivot 176 on the frame 30. The cam lever 175 is provided with a roller 177 which engages a pile warp heddle cam 178 on the main cam shaft 36 (see also Fig. 15).

The operation of the hook bar 180 to engage with and form a row of pile loops from pile warps raised in the form of a shed by pile warp harness 55 will be summarized with reference to Figs. 2–5 and 17 of the drawings, as follows:

As will clearly appear from these figures, the hook bar is constructed and arranged to support the drawn pile loops during the subsequent tying-in and beating up operation in a vertical position directly over that portion of the reed employed for beating up the successively inserted shots into the fell. The fact that all of the hook elements are mounted in a rigidly formed member extending entirely across the fabric insures that the loops drawn will each have a height which corresponds exactly with the position of the individual hook on its supporting member 86.

Fig. 3 shows the operation of the hook bar supporting arms 114 to take a new hook bar 84 from the chains 104. This operation takes place during the operation of inserting and beating up the row shot into the fell.

Fig. 4 shows the downward and counter-clockwise movement of the hook bar which is followed as the hook bar reaches the extreme downward position of Fig. 4 by a lateral movement to cause the offset hooks 88 to engage with the shedded pile warps. As shown in Fig. 4, the needle has been inserted to draw the bottom shot through the shed. The diagram A in Fig. 17 shows the parts at a slightly later point in the operation in which the hook bar has started its return rocking and upward movement to draw the loops, and in which the two legs of the bottom shot have been drawn through the shed.

Fig. 5 shows a subsequent position of the hook bar at the upward limit of its loop drawing movement, the reed having advanced to beat up the bottom shot and the needle 54 having been again inserted to draw the binder shot through the shed. Diagram B in Fig. 17 illustrates a slightly later stage of the operation in which the two legs of the binder shot have been drawn through the shed.

After the beating up operation of the binder shot takes place, the hook bar 84 is rotated rapidly in a counterclockwise direction to the position shown in diagram C in Fig. 17 to free the hook elements 88 from engagement with the drawn and tied-in pile loops.

In Fig. 2 the hook bar is shown in the position taken after completion of the counterclockwise wiping operation and as the hook bar starts upwardly on its return movement to the carrier chains 104.

Diagram D in Fig. 17 shows the parts at a still later point of the operation in which the two legs of the next row shot have been drawn through the shed.

A pile carpet having novel features of construction and design is produced in accordance with the invention on a carpet loom constructed and arranged and operating in the manner above described. The product is a loop pile carpet in which the pile loops in each successive row of weaving are drawn individually to variable exactly predetermined heights in order to produce a fabric having a loop pile structure which has distinctive qualities of precision and regularity and a range and variety of surface shapes not obtainable with looms of the prior art. It is possible, for example, to secure an extremely accurate gradation of loop heights by small amounts both weftwise and warpwise of the fabric, and also to place adjacent one another, in any direction, extremely high and extremely low loops to produce curved surfaces either separately or in combination with sharply edged grooves or ridges to produce sharply etched or carved effects.

Figure 19:
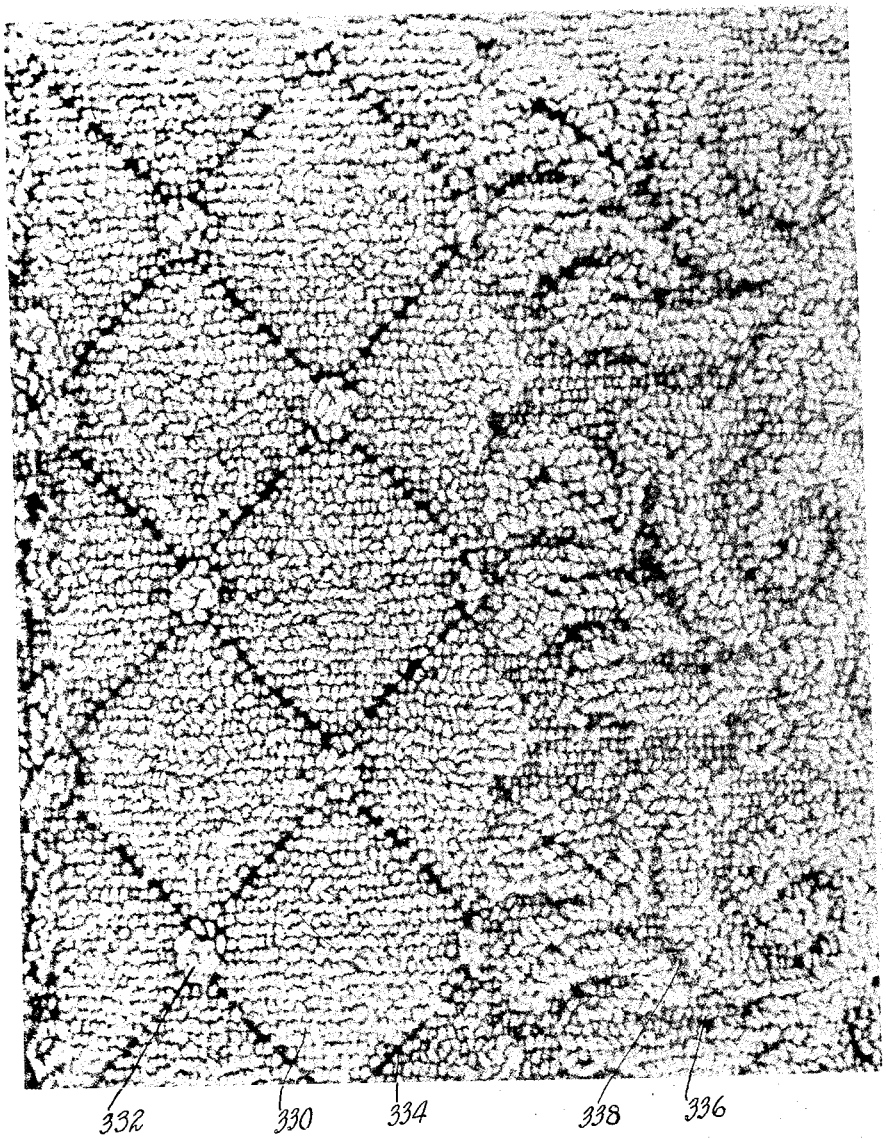
Fig. 19 is a photographic representation of two samples of a loop pile floor covering showing different arrangements of loop heights.
Figure 20:
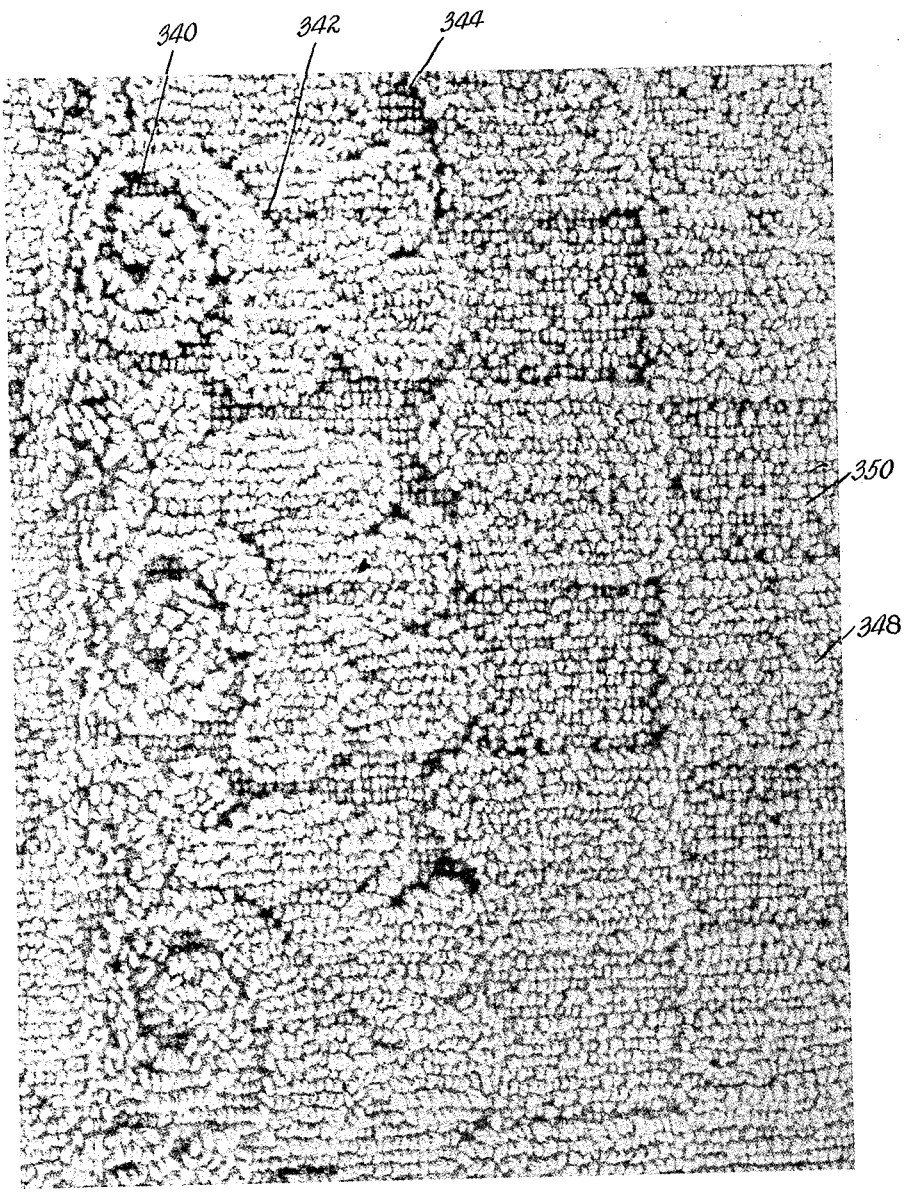
Fig. 20 is a photographic representation of a loop pile floor covering illustrating two additional arrangements of varying heights of pile in accordance with the invention.

The fabric produced upon the illustrated loom, and specifically shown in Figs. 18, 19 and 20, consists of an Axminster backing in combination with a loop pile surface comprising pile loops of individually selected heights drawn from pile warps woven into the Axminster backing. As previously noted in connection with Fig. 18, and as more specifically shown in Figs. 2-5 inclusive, the stuffer warps 76, semi-stuffer warps 78 and chain warps 80 are shedded in the normal manner of Axminster weaving, the sheds from these warps being disposed alternatively either in a downward or a substantially horizontal position to receive the weft inserting needle 54. The particular Axminster ground fabric weave shown in Figs. 18, 19 and 20 consists of a bottom shot which is produced by the insertion of the needle above the chain warps 78 and beneath all of the remaining warps. Next in sequence is the binder shot, which is produced by an arrangement of the warp shed to cause the weft inserting needle to pass beneath the semi-stuffer warps 80 and over all of the remaining warps. The arrangement of the several warps is such as to cause the binder shot to be beaten up into the fell directly over the bottom shot. The third and last of the three shots inserted in the sequence illustrated to form a row of weaving is the row shot. The warps are reshedded to cause the row shot to be inserted over the stuffer warps 76 and semi-stuffer warps 80, and under chain warps 78.

It will be understood that the invention is not limited to the specific form of Axminster weave shown, and that other well known and available weaves for an Axminster loom may be employed. It will be understood also that the invention in its broader aspects is not limited to an Axminster construction and that many of the advantages of applicant's invention may be obtained by the use of a hook bar or bars operating substantially in the manner described in a loom in which the weft is inserted by means of a shuttle.

Novel arrangements of high, low and intermediate loops produced in accordance with the invention are shown in the examples illustrated in Figs. 19 and 20 of the drawings. Referring to Fig. 19, a diamond pattern is produced in which the central portion of the diamond, designated at 330, is raised and the loops are gradually diminished in height toward the edges of the diamond to produce a rounded effect. With this pattern a knob or bud of high loops, designated at 332, is provided at each corner of the diamond. A line of demarcation 334 is produced between the edges of adjacent diamond by means of outs in which no loops at all are drawn. The loop construction and arrangement shown in the right hand portion of Fig. 19 illustrates the use of very low loops 336 as a fabric ground with adjacent thereto, groups of high loops which are pyramided to produce strongly marked ridges 338. It will be noted that the heights of the individual loops, both weftwise and warpwise of the fabric, are arbitrarily selected to produce the desired pattern effect.

The design illustrated in the left hand portion of Fig. 20 shows a sharply etched pattern in which configuration is obtained by utilizing a border of very high loops as at 340, adjacent a fabric ground produced by very low loops. In this instance the ground portion is bordered on both sides by loops which may be of maximum height, and it will be noted that the design is in the form of a curve which can be produced only by an arbitrary selection of high, low and intermediate loops, both lengthwise and widthwise of the fabric. In this pattern a simulation of a leaf is produced in which the central portion of the leaf is a valley formed by low loops separated into two groups by outs to form the spine 342 of the leaf. At each side of the spine the loops are of gradually increasing height until the sharply contoured outer edge 344 of the leaf is reached which again is formed of extreme high loops having adjacent thereto the very low loops of the adjacent fabric ground.

The design illustrated on the right side of Fig. 20 consists of squares 348 of high loops set in diagonal relation to squares 350 formed of low loops. The edges of the squares are sharply marked since no gradation is required between the groups of the high loops and groups of low loops either warpwise or weftwise of the fabric. It will be further noted that a somewhat rough pebbly surface effect in each of the squares is obtained by introducing slight variations in the heights of the individual loops in each of the high and low groups.

The invention having been described what is claimed is:

1. A woven pile fabric floor covering comprising a backing structure including stuffer warps, chain warps and wefts interwoven with said stuffer warps and chain warps in successive rows of weaving, and a pile surface which comprises pile loops raised from pile warps in a plurality of individually selected graduated heights providing a substantial range of such differing heights including pile loops of widely differing heights and intervening loops of graduated intermediate heights between a predetermined maximum and a predetermined minimum height in accordance with the dictation of a pattern, and in any desired sequence both weftwise and warpwise of the fabric providing selections of said pile loops graduated between said maximum and said minimum heights, and selections of said pile loops weftwise of the fabric of widely differing heights in adjacent relation omitting the intervening loops of graduated intermediate heights in said weftwise direction.

2. A woven pile fabric floor covering comprising a backing structure including stuffer warps, chain warps and wefts interwoven with said stuffer warps and chain warps in successive rows of weaving, and a pile surface which comprises pile loops raised from pile warps in a plurality of individually selected heights graduated in fractions of an inch between a predetermined maximum and a predetermined minimum height, and in any desired sequence both weftwise and warpwise of the fabric in accordance with the dictation of a pattern providing selections of pile loops graduated between maximum and minimum heights, and selections of said pile loops of maximum and minimum height in adjacent relation weftwise of the fabric.

3. A woven pile fabric floor covering comprising a backing structure including stuffer warps, chain warps and wefts interwoven with said stuffer warps and chain warps in successive rows of weaving, and a pile surface which comprises pile loops raised from pile warps in a plurality of individually selected graduated heights ranging between $3/16''$ and $11/16''$ by steps of $1/16''$, and in any desired sequence both weftwise and warpwise of the fabric in accordance with the dictation of a pattern providing selections of said pile loops of $3/16''$ height and in adjacent relation thereto loops of $11/16''$ height weftwise of the fabric.

4. A woven pile fabric floor covering comprising a backing structure including chain warps, stuffer warps extending substantially in straight directions, a set of wefts lying above the stuffer warps, a second set of wefts lying below the stuffer warps, all of said wefts being in pairs whereof the two wefts lie immediately adjacent to and in continuous contact with each other without intervening warps, the pairs of wefts of said second set being located below alternate pairs of the wefts of said first-mentioned set, and pile warps interwoven with said alternate pairs of wefts of said first-mentioned set and extending above the backing structure to form pile loops, in a plurality of individually selected graduated heights between a predetermined maximum and a predetermined minimum height in accordance with the dictation of a design, and in any desired sequence both weftwise and warpwise of the fabric providing selections of said pile loops graduated between said maximum and minimum heights, and selections of said pilot loops of widely differing heights in adjacent relation omitting intervening loops of graduated intermediate heights.

5. A woven pile fabric floor covering comprising a backing structure including chain warps, stuffer warps extending substantially in straight directions, a set of wefts lying above the stuffer warps, a second set of wefts lying below the stuffer warps, all of said wefts being in pairs whereof the two wefts lie immediately adjacent to and in continuous contact with each other without intervening warps, the pairs of wefts of said second set being located below alternate pairs of the wefts of said first-mentioned set, and pile warps interwoven with said alternate pairs of the wefts above said stuffer warps and extending above the backing structure to form pile loops, the loops in a weftwise row being of varying heights and the loops in a warpwise row being of varying heights, in accordance with a pattern, the loops in each of said weftwise and warpwise rows providing selections of said pile loops graduated between maximum and minimum heights and selections of said pile loops of maximum and minimum height in adjacent relation.

References Cited in the file of this patent

UNITED STATES PATENTS

| | | |
|---|---|---|
| 824,045 | Stewart | June 19, 1906 |
| 2,164,090 | Shuttleworth | June 27, 1939 |
| 2,318,080 | Keen | May 4, 1943 |
| 2,430,559 | Dacey | Nov. 11, 1947 |
| 2,546,261 | Groat | Mar. 27, 1951 |
| 2,715,918 | Eisler et al. | Aug. 23, 1955 |
| 2,731,985 | Hoeselbarth | Jan. 24, 1956 |

FOREIGN PATENTS

| | | |
|---|---|---|
| 273,409 | Great Britain | July 6, 1927 |
| 469,013 | Great Britain | July 14, 1937 |

UNITED STATES PATENT OFFICE
CERTIFICATE OF CORRECTION

Patent No. 2,834,807

May 13, 1958

Harry F. Jamrogowicz

It is hereby certified that error appears in the above numbered patent requiring correction and that the said Letters Patent should read as corrected below.

In the grant, lines 1 to 3, for "Harry F. Jamrogowicz, of Hazardville, Connecticut," read -- Harry F. Jamrogowicz, of Hazardville, Connecticut, assignor to Bigelow-Sanford Carpet Company, Inc., of Thompsonville, Connecticut, a corporation of Delaware, --; line 12, for "Harry F. Jamrogowicz, his heirs" read -- Bigelow-Sanford Carpet Company, Inc., its successors --; in the heading to the printed specification, line 3, for "Harry F. Jamrogowicz, Hazardville, Conn." read -- Harry F. Jamrogowicz, Hazardville, Conn., assignor to Bigelow-Sanford Carpet Company, Inc., Thompsonville, Conn., a corporation of Delaware --.

Signed and sealed this 17th day of March 1959.

(SEAL)

Attest:

KARL H. AXLINE
Attesting Officer

ROBERT C. WATSON
Commissioner of Patents